United States Patent [19]

Taylor

[11] 4,420,259

[45] Dec. 13, 1983

[54] DOUBLE COUPLED DUAL INPUT RATE SENSOR

[75] Inventor: Henry F. Taylor, Alexandria, Va.

[73] Assignee: The United States of America as represented by the Secretary of the Navy, Washington, D.C.

[21] Appl. No.: 314,299

[22] Filed: Oct. 23, 1981

[51] Int. Cl.³ .......................... G01C 19/64; G01B 9/02
[52] U.S. Cl. ..................................................... 356/350
[58] Field of Search ........................................ 356/350

[56] References Cited

PUBLICATIONS

Rashleigh et al., "Dual-Input Fiber-Optic Gyroscope" Optics Letters, vol. 5, No. 11, (Nov. 1980), pp. 482-484.

Primary Examiner—Vincent P. McGraw
Attorney, Agent, or Firm—Robert F. Beers; William T. Ellis

[57] ABSTRACT

An optical fiber coil rotation rate sensor including pro- vision for equal intensity dual inputs to its fiber coil to allow the device to operate at the quadrature point and circuitry to continuously adjust the phase in order to maintain operation at that quadrature point regardless of the rotation rate. The system includes an optical fiber coil for counterpropagating light beams therethrough and an input circuit for providing a first and second equal intensity light beams for counterpropagation through the fiber coil. The input circuit comprises a laser light source, a beamsplitter for splitting light from the laser source into two equal intensity beams, first and second elongate fiber waveguides for directing the equal intensity beams to the fiber coil for counterpropa- gation and including two elongate coextensive close- proximity sections for light beam coupling between the fiber waveguides, and a phase shifter circuit for auto- matically nulling the phase-shift in the beams returning from the coil. The phase-shift required to null the re- turning beams is proportional to the fiber coil rotation rate.

8 Claims, 3 Drawing Figures

DOUBLE COUPLED DUAL INPUT RATE SENSOR

BACKGROUND OF THE INVENTION

The present invention relates generally to devices responsive to angular motion or rotation, and more particularly to a Sagnac interferometer for measuring the angular rate of rotation of a platform.

Rotation rate sensors are utilized in a variety of different applications including use as a rate gyroscope and a gyroscope test turn-table, as well as application to tachometers for generator speed control, inertial navigation and non-magnetic compasses. In its most common application, the device is disposed in a gimbal mounting and used in the manner of a gyroscope, stablized about one sensitive axis or about two or three mutually perpendicular sensitive axes.

It has been known for some time that the Sagnac interferometer can be used to detect the rotation rate of any rotating frame. The Sagnac interferometer is based on the existence of the measurable phase shifting effect of angular motion upon the transmission of counter-propagating electromagnetic waves in a light circuit loop path disposed in the plane of the angular motion.

Referring to FIG. 1, there is shown a typical prior art Sagnac interferometer. The assembly of FIG. 1 is mounted on a platform and is designed to sense the rotation rate of that platform. A beam of light, in this case a laser beam from a laser source 10, is split by a beamsplitter 12 into two beams diverging at right angles to each other. These two beams are then focused by means of the lenses 14 and 16 into the ends of a helically wound single mode optical fiber coil 18. The light focused by the lens 14 traverses the optical fiber 18 in a clockwise direction, while the light focused by the lens 16 traverses the light path circuit 18 in a counter-clockwise direction. When these two counterpropagating optical beams have traversed in their respective directions through the light path circuit 18, they will again impinge upon the beamsplitter 12 and will interfere with each other. This light interference will form a fringe or interference pattern. As the platform on which the optical fiber coil 18 is rotated, there will be a measurable intensity change in the light interference patterns obtained from the beamsplitter 12. This measurable change in intensity is due to the relative phase shift between the light propagating in the clockwise direction and the counter-clockwise direction in the optical fiber coil 18 due to rotation. This change in intensity is proportional to the phase shift between the two counterpropagating optical beams which, in turn, is proportional to the rotation rate in the plane of the optical fiber coil 18. Thus, it is possible to measure the rotation rate in the plane by measuring the optical intensity of either or both of the interference pattern outputs from the optical beamsplitter 12. To this end, a photodetector 20 is disposed to detect the interference pattern component 19 and thus to measure the intensity $I_3$. Likewise, the interference pattern component 21 is directed by the beamsplitter 12 to a second beamsplitter 22 which directs a portion thereof to a photodetector 24 to measure intensity $I_4$.

It is well known that the phase shift between the counterpropagating optical beams and thus the intensities $I_3$ and $I_4$ in the optical fiber coil 18 vary sinosoidally with the variation of the rotation rate of the plane in which the fiber optic coil rests. This variation of the intensities $I_3$ measured at the photodetector 20 and $I_4$ measured at the photodetector 24 caused by the phase shift variation is plotted in FIG. 2 versus the rotation rate of the optical fiber coil platform. It can be seen that the optical intensities $I_3$ and $I_4$ are 180 degrees out of phase.

A particular problem with the Sagnac interferometer is that the sensitivity of the device is directly proportional to the slope or derivative of the interferometer output intensities $I_3$ and $I_4$. Accordingly, as can be seen from FIG. 2, the sensitivity of the device will vary from zero to a maximum as the slope or the derivative of the interferometer output intensities varies from zero to a maximum. It can also be seen that the maximum sensitivity point 30 is at the quadrature or 90 degree phase shift differential point. Likewise, the sensitivity approaches zero as the rotation rate approaches zero. This can be understood mathematically by noting that the detected intensity is proportional to $\cos^2\phi$, where $2\phi = 8\pi NA\Omega/\lambda c$, $\Omega$ is the Sagnac phase shift, NA is the total area enclosed by the fiber, and $\lambda$ and c are the free-space wavelength and light velocity, respectively.

Thus, it can be seen that sensitivity of the device may vary with the rotation rate being sensed. Rotation rates near the zero rotation rate or rotation rates that provides a 180 degree phase shift between the counterpropagating beams will be sensed with minimum sensitivity.

As noted above, in order to obtain a high sensitivity at low rotation rates, the Sagnac interferometer must be operated at its maximum sensitivity or the quadrature point. Accordingly, it is necessary to introduce a non-reciprocal phase bias of $\pi/2$ between the counterpropagating beams via some external means. Such a $\pi/2$ phase shift will make the detected intensity proportional to $\sin 2\phi \approx 2\phi$ for small rotation rates. Such a non-reciprocal phase shift may be introduced by applying a magnetic field to a portion of the fiber in the interferometer to induce a phase change via the magneto-optic Faraday effect. However, such a Faraday effect phase shifter requires large electrical currents. Additionally, a Faraday effect phase shifter only introduces non-reciprocal phase shift to light which is circularly polarized. Thus, this device would require an additional set of optical elements (quarter-wave plates) to convert the linearly polarized signal to circular polarization, and then back again. Moreover, such Faraday effect phase shifters are bulky devices and are difficult to maintain at the 90 degree phase shift point because of temperature drift problems.

A non-reciprocal phase shift could also be introduced by an electrooptic phase shifter included as an integral part of the interferometer loop. However, such an electrooptic device must be operated on a pulsed basis. Since such pulsed phase shift operation will have a transit time in the microsecond range, it is difficult to determine the precise amplitude of the phase shift that will be obtained. It should also be noted, both with respect to the electrooptic phase shifter and the Faraday effect phase shifter, that the introduction of such additional elements into the fiber optic path can cause increased interferometer noise due to reflections and increased susceptibility to external perturbation effects.

Accordingly, it can be seen from the above that it would be highly desirable to introduce a phase shift in a reciprocal fashion to thereby eliminate the problems attendant to the use of Faraday cells and electrooptic devices.

However, even if a reciprocal phase shift is inserted into the system, the sensitivity of the system will still be dependent on the rotation rate being sensed. Thus, a system which is phase shifted in order to operate at the quadrature point will have very high sensitivity for very low rotation rates, but will have a decreasing sensitivity as the rotation rate and thus the phase shift induced in the optical beams increases.

OBJECTS OF THE INVENTION

Accordingly, it is an object of the present invention to permit a rate sensor to operate at maximum sensitivity at all times regardless of rotation rate being sensed.

It is a further object of the present invention to eliminate non-reciprocal phase shift requirements in the rate sensor loop.

It is yet a further object of the present invention to provide a rate sensor system which utilizes the relative phase modulation between the light beams, as opposed to intensity modulation, to measure the rotation rate of the gyroscope loop.

It is a still further object of the present invention to automatically control the phase shift inserted into the gyroscope such that the system always operates at the maximum sensitivity quadrature point.

Other objects advantages and novel features of the invention will become apparent from the summary and the detailed description of the invention when considered in conjunction with the accompanying drawings wherein:

SUMMARY OF THE INVENTION

Briefly, the foregoing objects are accomplished in an optical rate sensor by providing a circuit for launching equal intensity dual inputs for counterpropagation through an optical waveguide loop to allow operation at the quadrature point and circuitry for continuously adjusting the phase between the counterpropagating beams in order to maintain operation at the quadrature point regardless of the rotation. This design may be realized in one embodiment by including
  first and second elongate optical paths connected at one end to the respective ends of the optical waveguide loop;
  a circuit for launching equal intensity light beams along the first and second optical paths;
  a phase shifting circuit for introducing a relative phase shift between light propagating in the first and second optical paths;
  a first 3 dB coupler disposed in the first and second optical paths for coupling the light beams propagating therein;
  a second 3 dB coupler disposed in the first and second optical paths following said first 3 dB coupler for coupling the light beams propagating therein;
  wherein light beams coupled through the first and second couplers are counterpropagated through the waveguide loop and propagated back through the first and second optical paths, and further including;
  means disposed between the first and second couplers for extracting a portion of the light beams propagating back from the waveguide loop through the first and second optical paths; and
  means for comparing the intensities of the extracted light beams and generating a control signal therefrom proportional to the difference in intensities therebetween and applying this signal to control the phase generated by the phase shifting circuit in order to cause the difference in extracted intensities to go to zero. This control signal is then proportional to the rotation rate of the waveguide loop.

DETAILED DESCRIPTION OF THE PREFERRED EMBODIMENT

Figure 1:
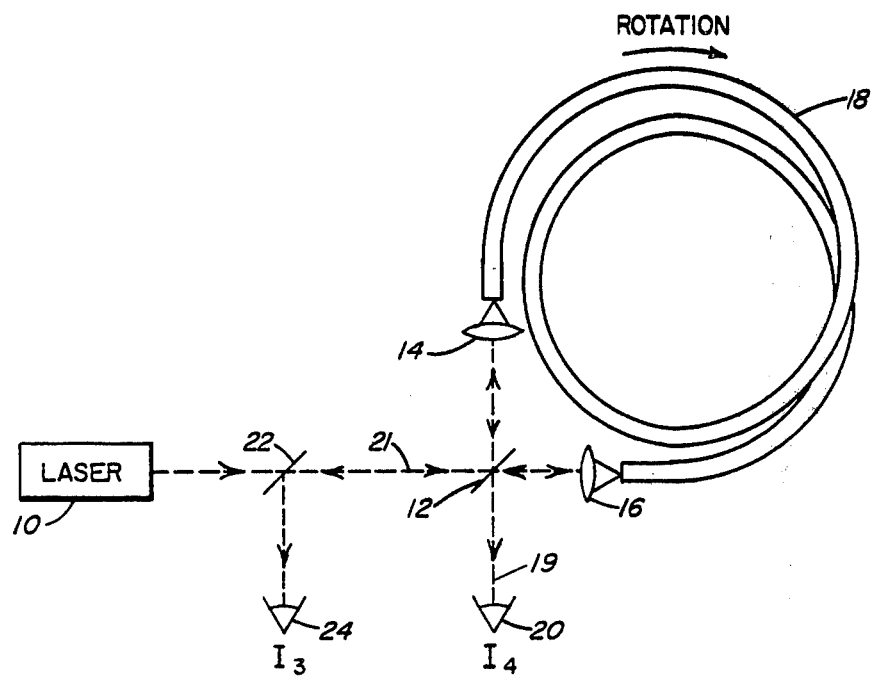
FIG. 1 is a diagrammatic representation of a typical prior art optical fiber rate sensor.
Figure 2:
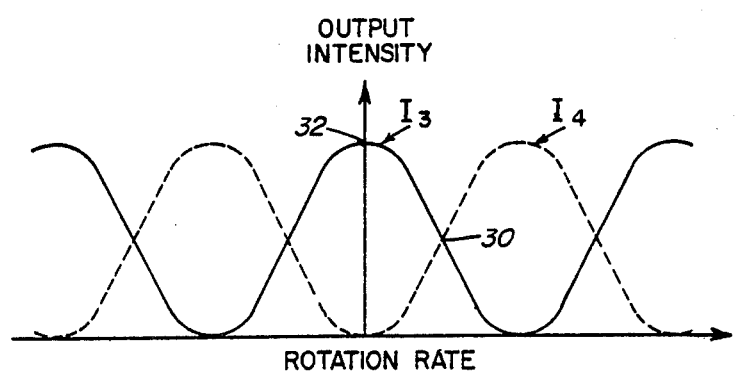
FIG. 2 is a plot of the output intensities taken from the beamsplitters 12 and 22 in FIG. 1 versus the rotation rate.
Figure 3:
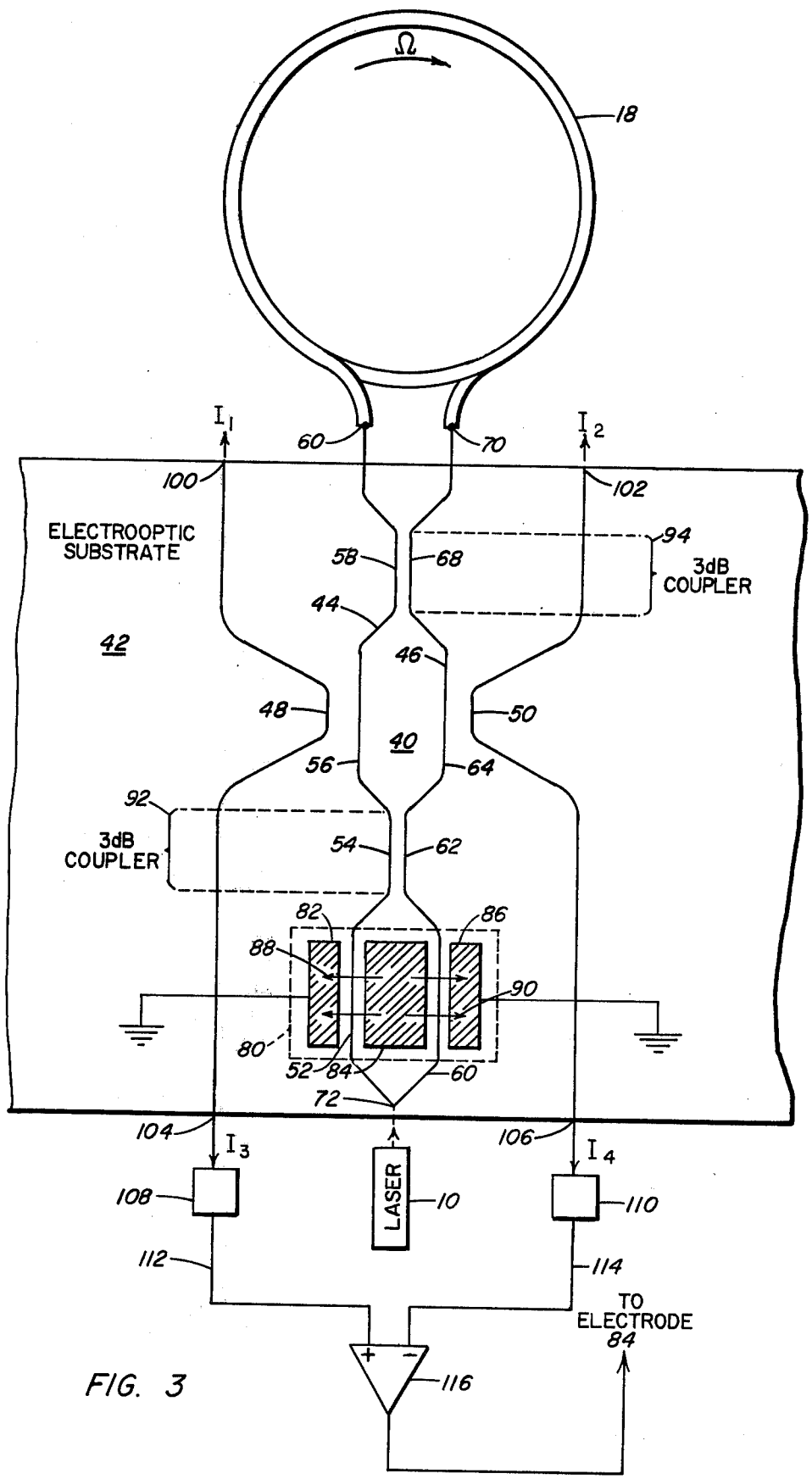
FIG. 3 is a diagrammatic representation of one embodiment of the present invention.

Referring now to FIG. 3, there is disclosed an embodiment of the double-coupled dual-input rate sensor of the present invention. This rate sensor comprises an optical circuit loop 18 including a plurality of turns in or parallel to a given plane, an optical source 10, and an input circuit 40 for generating optical beams from the optical source for counterpropagation in the waveguide loops of the light path circuit 18. Typically the light path circuit 18 may be realized by an optical fiber coil. The optical source 10 may be realized by a laser source.

The input circuit 40 is designed to provide equal intensity dual inputs for counterpropagation in the optical circuit loop 18. Supplying equal intensity inputs for counterpropagation in the optical circuit loop will force the rate sensor to act reciprocally so that it will automatically operate at the quadrature point when rotated from rest. Additionally, this input circuit 40 is specifically designed to operate on and continuously adjust the phase difference between the two inputs to the optical circuit loop 18 to thereby null-out the phase shift between these two optical beams. This nulling process permits the system to always operate at the quadrature point regardless of the rotation rate being measured.

The input circuit 40 will be disclosed in the context of an integrated optic configuration. However, it should be understood that the use of this integrated optic context for the disclosure is not intended as a limitation thereof. More specifically, this input circuit 40 could clearly be realized in a discrete component bulk configuration using either mirrors or fiber optics.

Referring again to FIG. 3, the configuration for the input circuit 40 is fabricated on a substrate of electrooptic material 42, such as lithium niobate. It is generally desired to produce a single mode optical waveguide pattern on the substrate 42. The optical waveguide pattern comprises essentially four optical waveguide paths 44, 46, 48, and 50. The first optical waveguide path 44 includes the optical segments 52, 54, 56, and 58. The optical waveguide path 44 is connected at one end to one output port of a 3 dB coupler or an approximately 50% beamsplitter 72 and at the other end 60 to one end of the optical circuit loop 18. The second optical waveguide path 46 includes the waveguide segments 60, 62, 64, and 68. This second waveguide path is connected at one end to the other output port of the 3 dB coupler or beamsplitter 72 and at the other end 70 to the other end of the optical circuit loop 18. The other optical waveguide paths 48 and 50 are utilized to pick off the signals propagating into the optical circuit loop 18 via the first and second optical waveguide paths 44 and 46, and also to pick off the light beams propagating in the opposite direction returning from the optical circuit loop 18. The waveguides 48 and 50 will be discussed in more detail at a later point in the disclosure.

The input circuit 40 also includes a phase shifting device 80 for nulling the relative phase shift between the returning optical beams. There are a variety of methods available for effecting such a phase shift. In the present embodiment an electrooptic phase shifter is utilized comprising the grounded electrodes 82 and 86, and the center control electrode 84. When a voltage V is applied to this center control electrode 84, two oppositely directed electric fields 88 and 90 are set up in the substrate as shown. These electric fields will induce a change in the index of refraction of the optical waveguide paths 52 and 60 crossing the fields between the electrodes, as is well known in the art. The induced change in the index of refraction will change the optical path length of the segments 52 and 60 thereby inducing a phase difference between the light beams propagating in the segments 52 and 60. This type of phase shifter for inducing a relative phase shift in two waveguide sections is typically referred to as a linear pockels cell, and the phase shift induced is proportional to the voltage V applied to the center electrode 84.

Following the phase shifter 80, are two 3 dB couplers 92 and 94. These 3 dB waveguide couplers are formed by reducing the separation between the first and second paths 44 and 46 such that they are co-extensive and in close proximity to each other in order to allow evanescent-field coupling therebetween. In particular, the first and second optical waveguide path segments 54 and 62 are shown in close proximity to each other to form the coupler 92. Likewise, the waveguide segments 58 and 68 are in close proximity to form coupler 94. The purpose of the two 3 dB couplers in series is to provide the signals which are phase shifted by the phase shifter 80 to the input points 60 and 70 into the optical circuit loop 18 without a change in phase. In this regard, it is known that a single 3 dB coupler will operate to change the phase modulation in light signals propagating therethrough to intensity modulation. The use of a second 3 dB coupler in series with the first 3 dB coupler will operate to change this intensity modulation back to phase modulation. Accordingly, signals being launched in opposite directions around the optical circuit loop 18 from the point 60 and 70 will have the same intensity and phase relationship as the signals entering the first 3 dB coupler 92.

As noted above waveguide paths 48 and 50 are utilized to monitor both the input and the output light beams in the system. To this end, waveguide segment 48 is disposed in close proximity to the segment 56 of the first waveguide path 44 in order to couple to light propagating in that waveguide path into the fiber 48 by evanescent-field coupling. In particular, light beams propagating in the first waveguide path 44 toward the optical circuit loop 18 are picked off by the waveguide path 48 and directed to the point 100. This monitored input signal of the first waveguide path 44 at point 100 is designated $I_3$. Likewise, the waveguide path 48 picks off a portion of the signal returning from the optical circuit loop 18 on the first waveguide path 44 and directs it to the point 104. This monitored output signal of first waveguide path 44 is designated $I_1$. In the same manner, the waveguide path 50 is disposed in close proximity to the section 64 of the second waveguide path 46 in order to couple via evanescent-field coupling light propagating in that second waveguide path. Thus, a portion of the light propagating in the second waveguide path 46 toward the optical circuit loop 18 will be coupled into the optical waveguide path 50 and propagated to the point 102. This input optical beam on the second waveguide path 46 is designated $I_4$. Likewise, a portion of the optical signal returning from the optical circuit loop 18 is coupled into the waveguide path 50 and is propagated to the point 106. This output signal on the second optical path is designated $I_2$.

The signals $I_1$ and $I_2$ representing the intensities of the output optical signals from the optical circuit loop 18 are utilized to control the relative phase shift being applied to the first and second waveguide paths 44 and 46. In particular, the optical signals at the points 104 and 106 are applied to photodetectors 108 and 110, respectively. These photodetectors convert the optical intensity of their respective input signals into electrical signals representative thereof. These electrical signals from the photodetectors 108 and 110 are then applied on the lines 112 and 114, respectively, to the inputs of a differential amplifier 116 in order to determine the difference therebetween. The differential amplifier 116 generates a voltage signal proportional to the difference between the signals on the lines 112 and 114. This voltage signal is applied to the center electrode 84 in the phase shifter 80 in order to control the relative phase shift generated applied thereby. It can thus be seen that a feedback loop is formed around the phase shifter 80 to cause the phase shifter to generate a sufficient phase shift to null the two optical output signals at the differential amplifier. The voltage signal required to null out the output signals at the points 104 and 106 is than proportional to the rotation rate in the plane of the optical circuit loop 18.

In operation, a light beam from the laser optical source 10 is applied to the beamsplitter 72 wherein it is split into two equal intensity light beams propagating on the first and second waveguide paths 44 and 46. As the light beams propagate in the waveguide segments 52 and 60, they are phase shifted by the phase shifter 80 in accordance with the voltage being applied thereto. The phase shifted signals in the first and second waveguide paths 44 and 46 are then coupled via evanescent-field coupling in the close-proximity waveguide segments 54 and 62. The first and second waveguide paths 44 and 46 are then separated at the waveguide segments 56 and 64 and are disposed in close proximity to the waveguide paths 48 and 50. The optical input signals on the first and second waveguide paths 44 and 46 may thus be monitored at the points of 100 and 102. The separation between the first and second waveguide paths is again reduced so that the light beams propagating in the segments 58 and 68 are again coupled by evanescent field coupling. As noted above, the evanescent-field coupling performed by the series couplers 92 and 94 acts to insure that the phase relationship and intensities of the light beams at the input to the coupler 92 is the same as the phase relationship and intensities of the light beams at the points 60 and 70 wherein the light beams are launched for counterpropagation in the optical circuit loop 18. After the 3 dB coupler 94, the first and second waveguide paths 44 and 46 than diverge in order to provide sufficient separation between the waveguides for interfacing with the two ends 60 and 70 of the optical circuit loop 18. The light beams introduced into the optical circuit loop 18 at the point 60 and 70 will propagate in opposite directions through the loop such that when they exit the loop, there will be a phase difference therebetween proportional to the rotation rate of the plane of the loop. These exiting or return light beams propagate back through the first and second waveguide paths 44 and 46. When these light beams have propagated through the 3 dB coupler 94, the relative phase difference therebetween will cause intensity modulation of the light beams. These intensity modulated light beams are then picked off by the waveguide paths 48 and 50 adjacent to the first and second waveguide paths 44 and 46, respectively, and directed toward the points 104 and 106. As noted previously, the signals at the points 104 and 106, namely $I_1$ and $I_2$, are utilized to independently monitor and control the phase shift induced in the phase shifter 80. Accordingly, these intensity modulated signals $I_1$ and $I_2$ are photodetected in the photodetectors 108 and 110, respectively, and then applied to the inputs of a differential amplifier 116. The differential amplifier generates a voltage V proportional to the difference intensities between the signals $I_1$ and $I_2$ and applies this voltage to the center electrode 84 in the phase shifter 80 in order to reduce this intensity difference to zero.

It should be noted that the input signals $I_3$ and $I_4$ picked off by the optical waveguide paths 48 and 50 may be used to independently monitor the phase shift induced by the applied voltage V from the differential amplifier 116.

As noted above, the use of equal intensities signals as inputs at the points 60 and 70 to the optical circuit loop 18 allows the device to operate at the quadrature point. It is important that the device be completely symmetrical in order to obtain these equal intensity inputs. Thus, if there are path length differences in the input circuit 40 as fabricated, the device must than be calibrated in order to remove the effects of these differences. The phase shifter 80 may be utilized to calibrate the system if there are path length differences occurring before the first 3 dB coupler in 92. If there are path length differences occurring after this 3 dB coupler 92, than a second phase shifter may be added to compensate therefore.

From the above disclosure, it can be seen that the present system has the ability to operate at the quadrature or maximum sensitivity point of the gyroscope regardless of the rotation rate being measured. This is accomplished by automatically adjusting the relative phase shift between the output light beams in order to null the system out. This nulling feature permits the system to operate at the quadrature point during all measurement.

In essence, the input circuit 42 to the gyroscope optical fiber coil 18 may be thought of as two Mach-Zehnder interferometers connected in series and sharing a common 3 dB coupler, with one of the Mach-Zehnder interferometers containing a phase shifting element which is controlled in a feedback loop by comparing the output intensities of the signals returning from the optical circuit loop.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A rotation measurement device comprising:
   a first optical path;
   a second optical path;
   means for directing equal intensity beams along said first and second optical paths, respectively;
   phase shifting means for generating a relative phase shift between the light beams propagating in said first and said second optical paths;
   a first 3 dB coupler disposed in said first and second optical paths for coupling the light beams propagating therein;
   a second 3 dB coupler disposed in said first and second optical paths following said first 3 dB coupler for coupling the light beams propagating therein;
   a light path circuit having a plurality of turns in or parallel to a given plane with one end thereof connected to said first optical path through said second 3 dB coupler and with the other end thereof connected to said second optical path through said second 3 dB coupler such that light beams will propagate in mutually opposite directions in said light path circuit;
   means disposed between said first and second 3 dB couplers for extracting a portion of the light signals propagating back from said light path circuit through said first and second light paths; and
   means for comparing the intensities of said extracted light signals and generating a control voltage therefrom proportional to the difference in intensities thereof and applying this control voltage to control the phase shift generated by said phase shifting means in order to cause the difference in extracted intensities to go to zero;
   wherein this control voltage applied to said phase shifting means in order to the force the difference in extracted intensities to go to zero is proportional to the rotation rate in said plane of said light circuit path.

2. A rotation measurement device as defined in claim 1, wherein said phase shifting means is an electrooptic phase shifter.

3. A rotation measurement device as defined in claim 1, wherein said beam directing means, said phase shifting means, said first and second 3 dB couplers, said first and second optical paths, and said signal extracting means are all disposed in an electrooptic substrate.

4. A rotation measurement device as defined in claim 1, wherein said beam directing means comprises:
   an optical source; and
   means for coupling equal intensity light beams from said optical source into said first and second optical paths to propagate therealong.

5. In an optical fiber gyroscope wherein light is introduced into the input ends of an optical fiber waveguide formed in a loop for counterpropagation therearound and to emerge therefrom for detection of the relative phase shift induced by rotation of the loop, the improvement residing in an input circuit for launching the lights beams to counterpropagate in said loop comprising:
   a first elongate optical waveguide adapted to have a light beam launched into one end thereof and connected at its other end to one end of said waveguide loop;
   a second elongate optical waveguide adapted to have at one end thereof a light beam launched equal in intensity to the beam launched in said first optical waveguide and connected at its other end to the other end of said waveguide loop;
   phase shifting means operable to generate a relative phase shift between the light propagating in said first and second optical waveguides;

wherein said first and second optical waveguides include a first elongate section thereof wherein the waveguides are coextensively disposed in close proximity to couple light therebetween;

wherein said first and second waveguides include a second elongate section thereof wherein the waveguides are coextensively disposed in close proximity to couple light therebetween;

wherein light propagating on said first and second waveguides through said first and second elongate coupling sections and having a relative phase shift therebetween from said phase shifting means is directed to counterpropagate through said waveguide loop; and including means disposed in said first and second waveguides for extracting a portion of the light signals propagating back from said waveguide loop through said first and second waveguides; and means for comparing the intensities of said extracted light signals and generating a control voltage therefrom proportional to the difference in intensities therebetween and applying this control signal to said phase shifting means to cause the difference in extracted intensities to go to zero;

wherein this control voltage is proportional to the rotation rate of said waveguide loop.

6. An optical fiber gyroscope as defined in claim 5, further including an optical source; and means for splitting the light beam into a first and second equal intensity beams and launching said first and second equal intensity beams into said first and second elongate waveguides, respectively.

7. An optical fiber gyroscope as defined in claim 6, wherein said phase shifting means is an electrooptic phase shifter.

8. An optical fiber gyroscope as defined in claim 7, wherein said optical source is a laser.

* * * * *